United States Patent Office 3,583,995
Patented June 8, 1971

3,583,995
1-(PYRIDYL-2')-3-(METHYL OR ETHYL)-3-METHYL-1,2,3,4 - TETRAHYDRO-ISOQUINOLINES AND SALTS THEREOF
Wolfhard Engel, Ernst Seeger, Helmut Teufel, and Hans Machleidt, Biberach an der Riss, Germany, assignors to Boehringer Ingelheim G.m.b.H., Ingelheim am Rhein, Germany
No Drawing. Filed Mar. 6, 1968, Ser. No. 710,744
Claims priority, application Germany, Mar. 10, 1967, T 33,402
The portion of the term of the patent subsequent to July 22, 1986, has been disclaimed
Int. Cl. C07d 35/10
U.S. Cl. 260—288                                      6 Claims

ABSTRACT OF THE DISCLOSURE

Compounds of the formula

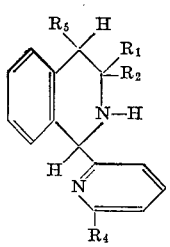

wherein $R_1$ and $R_2$ are each methyl or ethyl, and
$R_4$ and $R_5$ are each hydrogen or methyl, and their non-toxic, pharmacologically acceptable acid addition salts; the compounds and their salts are useful as liver ferment activators in warm-blooded animals, as indicated by increase in liver weight.

---

This invention relates to lower alkyl substitution products of 1-(pyridyl-2')-1,2,3,4-tetrahydro-isoquinolines and acid addition salts thereof, as well as to a method of preparing these compounds.

More particularly, the present invention relates to compounds of the formula

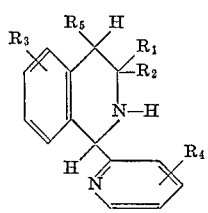

(I)

wherein:

$R_1$ and $R_2$, which may be identical to or different from each other, are each alkyl of 1 to 3 carbon atoms, and
$R_3$, $R_4$ and $R_5$, which may also be identical to or different from each other, are each hydrogen or methyl, and their non-toxic, pharmacologically acceptable acid addition salts.

The compounds of the Formula I above may be prepared by reducing a 1-(pyridyl-2')-2-hydroxy-1,2,3,4-tetrahydro-isoquinoline of the formula

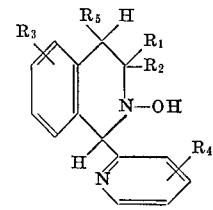

(II)

wherein $R_1$, $R_2$, $R_3$, $R_4$ and $R_5$ have the same meanings as in Formula I, with (1) hydrogen in the presence of a hydrogenation catalyst, or (2) nascent hydrogen, or (3) a complex metal hydride.

Hydrogenation catalysts suitable for the catalytic hydrogenation are the customary metal catalysts, such as Raney nickel or copper chromium oxide. The hydrogenation is carried out at elevated pressure, such as between 50 and 200 atmospheres and preferably between 100 and 150 atmospheres, at moderately elevated temperatures and in the presence of an organic solvent which is inert under the reaction conditions, such as a lower alkanol, preferably ethanol or methanol.

The nascent hydrogen may be generated pursuant to customary methods, that is, by treating a metal such as tin with a mineral acid such as hydrochloric acid.

The reduction with a complex metal hydride is carried out in customary fashion and in the presence of a suitable inert organic solvent, such as ether, tetrahydrofuran or a lower alkanol, particularly methanol, ethanol or the like. Suitable complex metal hydrides are lithium aluminum hydroxide, sodium borohydride or the like.

The starting compounds of the Formula II, which themselves are novel compounds, may be prepared by subjecting a pyridine aldoxime of the formula

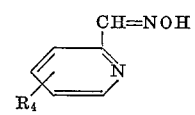

(III)

wherein $R_4$ has the same meaning as in Formula I, to cyclization reaction with a compound of the formula

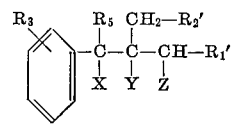

(IV)

wherein $R_1'$ and $R_2'$, which may be identical to or different from each other, are hydrogen atoms or alkyls of 1 to 2 carbon atoms, and $R_3$ and $R_5$ have the same meanings as in Formula I, and one of X and Y is hydroxyl, esterified hydroxyl, such as acetoxy, or halogen while the other and Z are hydrogen, or Y together with X or Z represents a double bond, in the presence of a strong acid or a Lewis acid.

The compounds defined by Formula I are organic bases and therefore form acid addition salts with inorganic or organic acids. Examples of non-toxic, pharmacologically acceptable acid addition salts are those formed with hydrochloric acid, hydrobromic acid, sulfuric acid, phosphoric acid, succinic acid, tartaric acid, citric acid, adipic acid, maleic acid, fumaric acid, 8-chlorotheophylline or the like. Such acid addition salts may be prepared by conventional methods, that is, for instance, by dissolving the free base in a suitable solvent and acidifying the solution with the desired inorganic or organic acid.

The following examples further illustrate the present invention and will enable others skilled in the art to understand it more completely. It should be understood, however, that the invention is not limited solely to the particular examples given below.

EXAMPLE 1

3,3-dimethyl-1-(pyridyl-2')-1,2,3,4-tetrahydro-isoquinoline 12.7 gm. of 3,3 - dimethyl-2-hydroxy-1-(pyridyl-2')-1,2,3,4-tetrahydro-isoquinoline were dissolved in 100 cc. of ethanol, 2 gm. of copper chromium oxide were added to the solution, and the mixture was shaken for 1½ hours at 130° C. while under a hydrogen pressure of 150 atmospheres. Thereafter, the catalyst was filtered off, the ethanol was distilled out of the filtrate, and the residue was crystallized from petroleum ether. 9 gm. of colorless crystalline 3,3-dimethyl-1-(pyridyl-2')-1,2,3,4-tetrahydro-isoquinoline, M.P. 79° C., of the formula

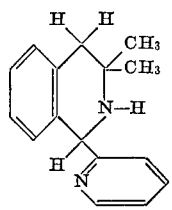

were obtained.

EXAMPLE 2

6.3 gm. of 3,3 - dimethyl - 2-hydroxy-1-(pyridyl-2')-1,2,3,4-tetrahydro-isoquinoline were admixed with 20 gm. of granulated tin, 62.5 cc. of concentrated hydrochloric acid, 30 cc. of water, 62.5 cc. of ethanol and 1 drop of an aqueous 5% copper sulfate solution, and the mixture was refluxed for three hours. Thereafter, the unreacted tin was filtered off, the filtrate was made strongly alkaline with aqueous 40% sodium hydroxide, and the alkaline solution was extracted with chloroform. The chloroform extract solution was evaporated, and the oily residue was stirred with a small amount of petroleum ether, whereupon crystallization occurred. The crystalline product was then recrystallized from petroleum ether, yielding 4 gm. of colorless crystalline 3,3-dimethyl-1-(pyridyl-2')-1,2,3,4-tetrahydro-isoquinoline, M.P. 79° C.

EXAMPLE 3

Using a procedure analogous to that described in Example 2, 3 - ethyl-3-methyl-1-(pyridyl-2')-1,2,3,4-tetrahydro-isoquinoline, B.P. 124° C. at 0.1 mm. Hg, of the formula

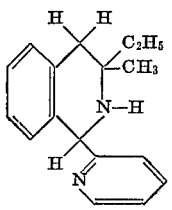

was prepared from 2-hydroxy-3-ethyl-3-methyl-1-(pyridyl-2')-1,2,3,4 - tetrahydro-isoquinoline. Its dihydrobromide had a melting point of 253–254° C.

EXAMPLE 4

Using a procedure analogous to that described in Example 2, 3,3-diethyl-1-(pyridyl-2')-1,2,3,4-tetrahydroisoquinoline, M.P. 101° C., was prepared from 2-hydroxy-3,3 - diethyl - 1 - (pyridyl-2')-1,2,3,4-tetrahydro-isoquinoline.

EXAMPLE 5

Using a procedure analogous to that described in Example 2, 3,3,4-trimethyl-1-(pyridyl-2')-1,2,3,4-tetrahydro-isoquinoline, M.P. 103–105° C., of the formula

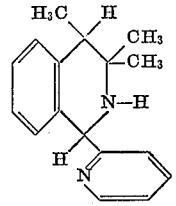

was prepared from 2-hydroxy-3,3,4-trimethyl-1-(pyridyl-2')-1,2,3,4-tetrahydro-isoquinoline.

EXAMPLE 6

3,3-dimethyl-1-(6'-methyl-pyridyl-2')-1,2,3,4-tetrahydroisoquinoline 13.4 gm. of 3,3 - dimethyl - 2 - hydroxy-1-(6'-methyl-pyridyl-2')-1,2,3,4-tetrahydro-isoquinoline were admixed with 3 gm. of Raney nickel and 100 cc. of methanol, and the mixture was shaken for one hour at 50° C. under a hydrogen pressure of 100 atmospheres. Thereafter, the catalyst was filtered off, the filtrate was evaporated, and the residue was recrystallized from petroleum ether. 8 gm. of colorless crystalline 3,3 - dimethyl-1-(6'-methyl-pyridyl-2')-1,2,3,4-tetrahydro-isoquinoline, M.P. 80° C., of the formula

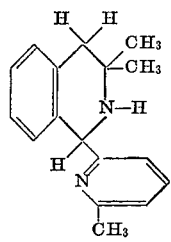

were obtained.

EXAMPLE 7

1.5 gm. of sodium borohydride were added in small portions over a period of one hour to a solution of 6.3 gm. of 3,3 - dimethyl - 2-hydroxy-1-(pyridyl-2')-1,2,3,4-tetrahydroisoquinoline in 75 cc. of ethanol at 60° C. After all of the sodium borohydride had been added, the mixture was refluxed for 5 hours, and then 1.5 gm. of sodium borohydride were added to the reaction mixture three times at 5 hour intervals. Thereafter, a few drops of acetone were added, the ethanol was distilled off in vacuo, the residue was taken up in hydrochloric acid, the acid solution was extracted with ether, and the ether extract solutions were discarded. The acid aqueous phase was made alkaline with dilute sodium hydroxide, the oil precipitated thereby was taken up in chloroform, the chloroform was distilled off, and the residue was recrystallized from petroleum ether. 4.0 gm. of colorless crystalline 3,3 - dimethyl-1-(pyridyl-2')-1,2,3,4-tetrahydro-isoquinoline, M.P. 79–80° C., were obtained.

The compounds according to the present invention, that is, those embraced by Formula I and their non-toxic, pharmacologically acceptable acid addition salts, have useful pharmacodynamic properties. More particularly, they have an activating effect upon the ferments or enzymes of the liver in warm-blooded animals, such as rats.

The liver ferment activating property of the compounds according to the present invention was ascertained by means of a standard pharmacological test, namely the shortening effect upon barbiturate sleep in rats.

A group of ten adult laboratory rats were administered 75 mgm./kg. of hexobarbital intraperitoneally, and the average duration of sleep (suspension of the righting reflex) was determined for the group. Thereafter, to another group of ten test animals were given 7.5 mgm./kg. of the compound under investigation per os, and 24 hours later 75 mgm./kg. of hexobarbital were administered intraperitoneally. The average duration of sleep was again determined, and the reduction in the duration of hexobarbital sleep, if any, was expressed in terms of percent. The following results were obtained:

TABLE

| Compound | Dose per os, mgm./kg. | Reduction in duration in hexobarbital sleep, percent |
| --- | --- | --- |
| 3,3-Dimethyl-1-(pyridyl-2'-1,2,3,4-tetrahydro-isoquinoline·2HCl | 7.5 | 49.3 |
| 3-Ethyl-3-methyl-1-(pyridyl-2')-1,2,3,4-tetrahydro-isoquinoline·2HBr | 7.5 | 43.7 |

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.41 to 5.0 mgm./kg. body weight, preferably 0.83 to 4.2 mgm./kg.

The following examples illustrate a few dosage unit compositions comprising a compound of the instant invention as an active ingredient and represent the best mode contemplated of putting the invention to practical use. The parts are parts by weight unless otherwise specified.

EXAMPLE 8

Tablets

The tablet composition was compounded from the following ingredients:

| | Parts |
| --- | --- |
| 3,3-dimethyl-1-(pyridyl-2')-1,2,3,4-tetrahydro-isoquinoline dihydrochloride | 150.0 |
| Colloidal silicic acid | 100.0 |
| Lactose | 240.0 |
| Potato starch | 100.0 |
| Tartaric acid | 5.0 |
| Magnesium stearate | 5.0 |
| Total | 600.0 |

Compounding procedure

The isoquinoline compound was admixed with the colloidal silicic acid, the lactose and one-half of the indicated amount of potato starch, the mixture was moistened with an aqueous 3.5% solution of the tartaric acid, the moist mass was forced through a 1.5 mm.-mesh screen, the moist granulate obtained thereby was dried at 45° C., and the dry granulate was again passed through the screen and was then admixed with the remainder of the potato starch and with the magnesium stearate. The finished composition was pressed into 600 mgm.-tablets. Each tablet contained 150 mgm. of the isoquinoline compound and, when administered perorally to a warm-blooded animal of about 60 kg. body weight in need of such treatment, produced very good liver ferment activating effects.

EXAMPLE 9

Coated pills

The pill core composition was compounded from the following ingredients:

| | Parts |
| --- | --- |
| 3,3-dimethyl-1-(pyridyl-2')-1,2,3,4-tetrahydro-isoquinoline dihydrochloride | 25.0 |
| Colloidal silicic acid | 15.0 |
| Lactose | 63.0 |
| Potato starch | 15.0 |
| Tartaric acid | 1.0 |
| Magnesium stearate | 1.0 |
| Total | 120.0 |

Compounding procedure

The individual ingredients were admixed and the mixture granulated in a manner analogous to that described in Example 8, and the finished composition was pressed into 120 mgm.-pill cores, which were subsequently coated with a thin shell consisting essentially of sugar and talcum, and polished with beeswax. Each coated pill contained 25 mgm. of the isoquinoline compound and, when administered perorally to a warm-blooded animal of about 60 kg. body weight in need of such treatment, produced very good liver ferment activating effects.

EXAMPLE 10

Hypodermic solution

The solution was compounded from the following ingredients:

| | Parts |
| --- | --- |
| 3-ethyl-3-methyl-1-(pyridyl-2')-1,2,3,4-tetrahydro-isoquinoline dihydrobromide | 50.0 |
| Citric acid ·$H_2O$ | 14.0 |
| Secondary sodium phosphate ·2 $H_2O$ | 6.0 |
| Distilled water q.s.ad 2000.0 by vol. | |

Compounding procedure

The citric acid, the sodium phosphate and the isoquinoline compound were dissolved in a sufficient amount of distilled water, the solution was diluted to the indicated volume with additional distilled water, and the dilute solution was filtered until free from suspended particles. The filtrate was filled into brown 2 cc. ampules, which were sealed and then sterilized for 30 minutes at 100° C. Each ampule contained 50 mgm. of the isoquinoline compound, and when the contents thereof were administered intravenously to a warm-blooded animal of about 60 kg. body weight in need of such treatment, very good liver ferment activating effects were produced.

EXAMPLE 11

Suppositories

The suppository composition was compounded from the following ingredients:

| | Parts |
| --- | --- |
| 3,3-dimethyl-1-(pyridyl-2')-1,2,3,4-tetrahydro-isoquinoline dihydrochloride | 100.0 |
| Cocoa butter | 1630.0 |
| Total | 1730.0 |

Compounding procedure

The isoquinoline compound, in finely pulverized form, was stirred with the aid of an immersion homogenizer into the cocoa butter which had previously been melted and cooled to 40° C. The mixture was poured into cooled suppository molds, each holding 1730 mgm. of the mixture. One suppository contained 100 mgm. of the isoquinoline compound and, when administered by the rectal route to a warm-blooded animal of about 60 kg. body weight in need of such treatment, produced very good liver ferment activating effects.

Although the above dosage unit composition examples illustrate only two compounds of the present invention as active ingredients, it should be understood that any other compound embraced by Formula I or a non-toxic, pharmacologically acceptable acid addition salt thereof may be substituted for the particular isoquinoline compound in Examples 8 through 11. Moreover, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments,

We claim:
1. A compound of the formula

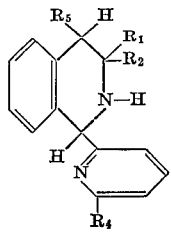

wherein $R_1$ and $R_2$ are each methyl or ethyl and $R_4$ and $R_5$ are each hydrogen or methyl, or a non-toxic, pharmacologically acceptable acid addition salt thereof.

2. A compound according to claim 1, wherein $R_1$ and $R_2$ are methyl and $R_4$ and $R_5$ are hydrogen.

3. A compound according to claim 1, wherein $R_1$ is methyl, $R_2$ is ethyl and $R_4$ and $R_5$ are hydrogen.

4. A compound according to claim 1, wherein $R_1$ and $R_2$ are ethyl and $R_4$ and $R_5$ are hydrogen.

5. A compound according to claim 1, wherein $R_1$, $R_2$ and $R_4$ are methyl and $R_5$ is hydrogen.

6. A compound according to claim 1, wherein $R_1$, $R_2$ and $R_5$ are methyl and $R_4$ is hydrogen.

References Cited

UNITED STATES PATENTS

| | | | |
|---|---|---|---|
| 3,133,926 | 5/1964 | Kuhne | 260—288X |
| 3,457,265 | 7/1969 | Seeger et al. | 260—288 |

OTHER REFERENCES

Silvestrini et al. Biochemical Pharmacology, vol. 15, pp. 249–54 (1966).

Rennes, Proc. of First Internal. Pharmacal. Meeting, vol. 6, pp. 235–56 (1962).

DONALD G. DAUS, Primary Examiner

U.S. Cl. X.R.

260—256, 286, 297, 690; 424—258